United States Patent [19]

Murakami et al.

[11] Patent Number: 4,580,648
[45] Date of Patent: Apr. 8, 1986

[54] MOTOR-DRIVEN POWER STEERING SYSTEM

[75] Inventors: Noboru Murakami, Nagoya; Akio Hashimoto, Kawasaki; Tomio Yasuda, Kasukabe, all of Japan

[73] Assignee: Aisin Seiki Kabushiki Kaisha, Kariya, Japan

[21] Appl. No.: 571,164

[22] Filed: Jan. 16, 1984

[30] Foreign Application Priority Data

Jan. 17, 1983 [JP] Japan .................. 58-005494

[51] Int. Cl.$^4$ ............................... B62D 5/04
[52] U.S. Cl. ................... 180/79.1; 180/142; 318/139; 318/433
[58] Field of Search ............ 318/539, 432, 433, 139; 180/79.1, 142

[56] References Cited

U.S. PATENT DOCUMENTS

| | | | |
|---|---|---|---|
| 3,944,014 | 3/1976 | Maisch et al. | 180/142 |
| 4,419,610 | 12/1983 | Pollman | 318/139 |

FOREIGN PATENT DOCUMENTS

| | | | |
|---|---|---|---|
| 0051515 | 10/1981 | European Pat. Off. | |
| 5520 | 1/1979 | Japan | 318/432 |
| 53427 | 4/1979 | Japan | 180/142 |
| 56124 | 5/1979 | Japan | 318/432 |
| 201762 | 12/1982 | Japan | 180/142 |
| 1370592 | 10/1974 | United Kingdom. | |
| 1395954 | 5/1975 | United Kingdom. | |
| 1462089 | 1/1977 | United Kingdom. | |
| 1465584 | 2/1977 | United Kingdom. | |
| 2002303A | 2/1979 | United Kingdom. | |
| 760365 | 9/1980 | U.S.S.R. | 318/432 |

*Primary Examiner*—Craig R. Feinberg
*Assistant Examiner*—David A. Okonsky
*Attorney, Agent, or Firm*—Sughrue, Mion, Zinn, Macpeak, and Seas

[57] ABSTRACT

A power steering system makes use of an electric motor to produce an auxiliary torque added to the torque which is applied to the steering wheel of a vehicle by the driver. The system includes a motor driver for driving the motor and a motor braking circuit for braking the motor. When the torque manually applied to the steering shaft of the vehicle is greater than a predetermined reference torque, an electronic control apparatus causes the motor driver to energize the motor according to the difference between these two torques. When the former torque is less than the reference torque, the control apparatus causes the motor braking circuit to brake the motor. In this way, the torque that the driver of the vehicle must apply to steer the vehicle is maintained equal to the reference torque, irrespective of the vehicle velocity. The reference torque is set by means of a variable-resistor.

4 Claims, 12 Drawing Figures

MOTOR-DRIVEN POWER STEERING SYSTEM

FIELD OF THE INVENTION

The present invention relates to a power steering system using an electric motor to produce an auxiliary steering force for augmenting the torque that is applied to the steering wheel of a vehicle by the driver.

BACKGROUND OF THE INVENTION

When a vehicle is at rest or moving at a lower velocity, a large force is required to rotate the steering wheel for veering the tires. Especially, so-called FF (front-engine, front wheel) vehicles which have become increasingly popular in recent years require still greater force to be applied to the steering wheel, because the front tires of this kind of vehicle bear greater weight.

It is known that a power steering system augments the torque that is applied to the steering wheel of a vehicle by the driver. This steering system produces a driving force in response to the manual steering force exerted by the driver, and the produced force is transmitted to the steering mechanism. Most power steering systems which are now put into practical use are hydraulic in structure. In particular, such a hydraulic system includes a control valve, a hydraulic cylinder, etc., and produces an auxiliary steering force by moving oil in response to the steering force applied by the driver.

Unfortunately, the aforementioned control valve, oil cylinder, and so forth are bulky. Further, pipings for interconnecting these components cannot be bent with a curvature less than a given value to prevent occurrence of a large pressure loss. In addition, a hydraulic system requires seals to be certainly installed for preventing oil leakage. Furthermore, it is cumbersome to install such a hydraulic system. For these reasons, it is difficult to install a power steering system in a vehicle having a small space available for the installation such as an FF vehicle.

Meanwhile, a larger force is needed to steer a vehicle as the velocity decreases, and vice versa. The prior art power steering system operates at all times, irrespective of the vehicle velocity. Therefore, no problem arises at lower velocities, but the force necessary to steer the vehicle is inordinately reduced at higher velocities. This may introduce the possibility that a driver who is unaccustomed to the power steering system rotates the steering wheel through an excessive angle, thus incurring a danger. Also, that a somewhat large force is required to steer the vehicle when it runs at a high velocity makes it easier even for drivers accustomed to power steering to drive the vehicle. Thus, a power steering system has been proposed which measures the velocity of the vehicle and produces an auxiliary torque matched to the velocity. However, the control system of the steering system is very complicated and hence it is expensive.

SUMMARY OF THE INVENTION

It is the main object of the present invention to provide a power steering system which maintains the torque needed to steer a vehicle at a constant value, irrespective of the velocity, the value being selected to be relatively small to facilitate the driving of the vehicle.

The foregoing object is achieved by providing a power steering system which uses an electric motor as a torque generating source, and which further includes a means for driving the motor and a means for braking the motor. When the steering torque is in excess of a predetermined reference torque, the driving means is energized. When the reference torque is not reached, the braking means is energized.

Specifically, when the steering torque is less than the reference torque as encountered at high velocities, the steering torque is too small and hence the motor is braked. On the other hand, when the steering torque is greater than the reference torque as encountered at quite low velocities, the motor is driven to augment the force applied by the driver. Consequently, the torque that the driver is required to apply for veering the vehicle is automatically made equal to the reference torque at all times. Therefore, the driver can steer the vehicle always with a constant torque without the need to pay attention to the vehicle velocity.

The motor can easily be braked by the use of a resistor or the like. More specifically, when no load is connected to the coil in the motor, no current flows in the coil, and therefore no braking force is generated against any external force. When a load is connected to it, an electric current flows in the coil according to the amount of the load. Therefore, the motor produces a force in a direction opposed to an externally applied force, i.e., a braking force.

In one preferred aspect of the invention, the period during which the load is connected to the motor is controlled by the pulse duration of pulses, whereby varying the magnitude of the braking force. This permits the steering force to be accurately controlled such that it coincides with a reference torque.

Other objects and features of the invention will appear in the course of description that follows.

BRIEF DESCRIPTION OF THE DRAWINGS

FIG. 3b is a perspective view of the steering mechanism of FIG. 3a;

DETAILED DESCRIPTION OF THE INVENTION

Figure 1:
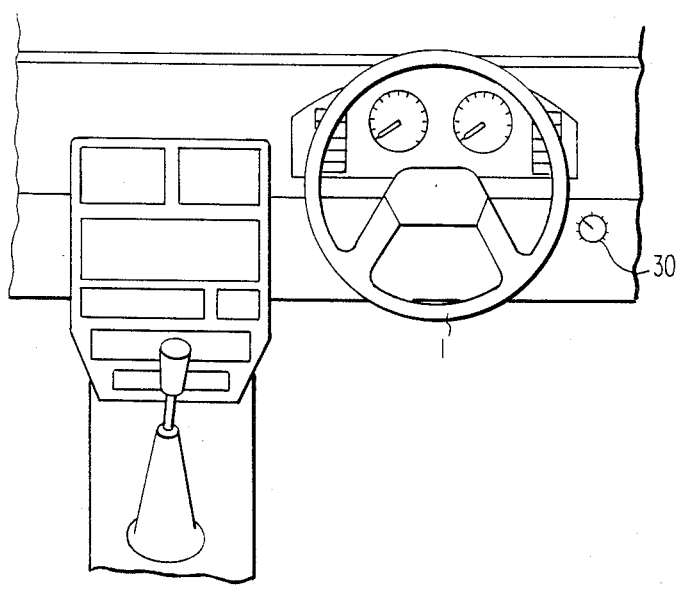
FIG. 1 is a view showing the vicinity of the driver's seat of an automobile equipped with a power steering system according to the present invention.

Referring first to FIG. 1, there is shown the vicinity of the driver's seat of a vehicle equipped with a motor-driven power steering system according to the present invention. A knob 30 for setting the steering torque produced by the power steering system is disposed on the dashboard and near the steering wheel. This knob 30 is firmly secured to to the rotating shaft of a variable-resistor VR1 (described later).

Figure 2:
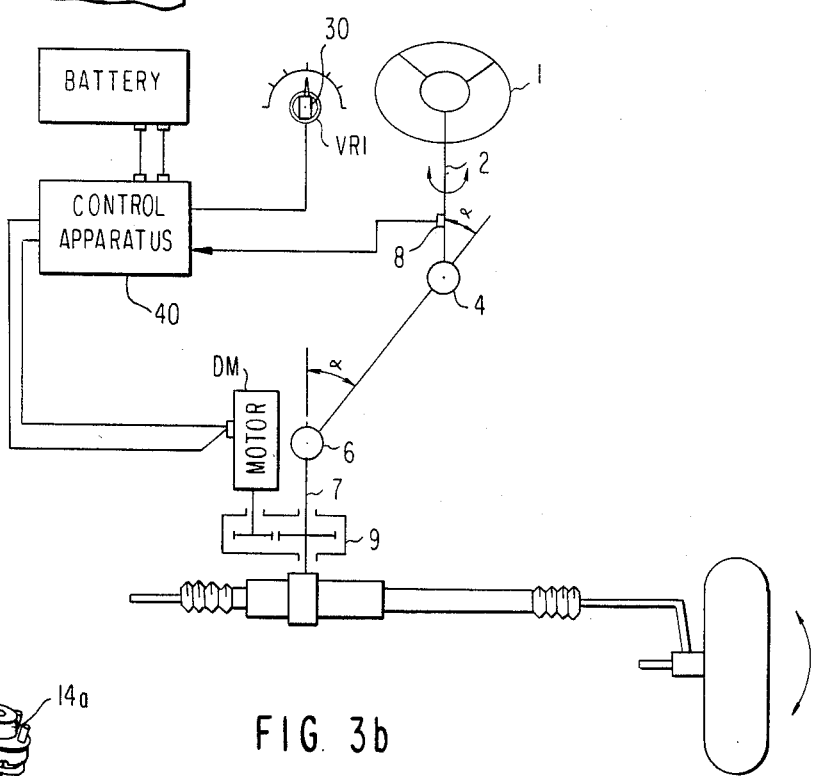
FIG. 2 is a schematic block diagram of the power steering system.

Referring next to FIG. 2, the whole construction of the power steering system mounted in the vehicle shown in FIG. 1 is schematically shown. In this system, a first steering shaft 2 is connected to the steering wheel 1 of the vehicle, and a second steering shaft 5 is connected to the first shaft 2 via a first universal joint 4. A third steering shaft 7 is connected to the second shaft 5 via a second universal joint 6. Firmly fixed to the tip of the third shaft 7 is a pinion 3a (see FIG. 3a) with which a rack 3b (see FIG. 3b) for driving the steering wheel meshes. The angle $\alpha$ at which the second shaft 5 is inclined from the first shaft 2 is equal to the angle $\alpha$ at which the third shaft 7 is inclined from the second shaft 5. Torque sensors 8 (only one is shown in FIG. 2) are fixedly secured to the first shaft 2. A direct-current servomotor DM is connected to the third shaft 7 via a reduction gearing 9. The output of each sensor 8 is connected to a control apparatus 40, the output of which is connected with the motor DM. The aforementioned variable-resistor VR1 to which the knob 30 is fixed is connected to the control apparatus 40.

Figure 3B:
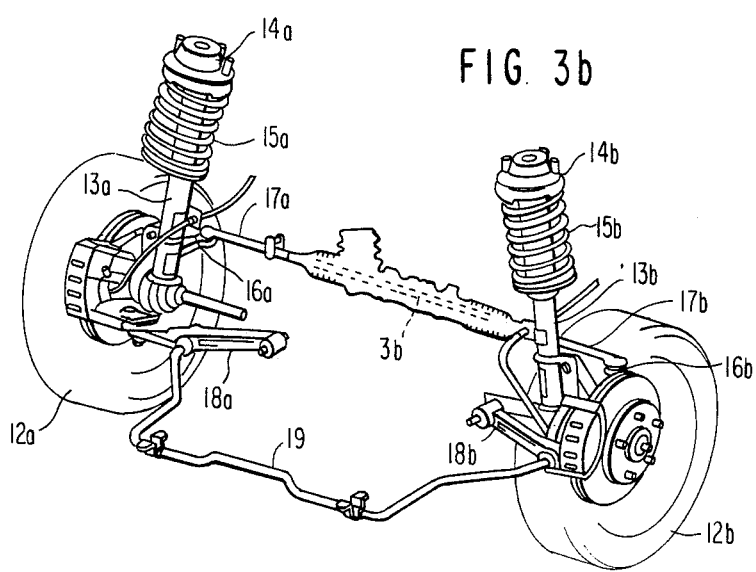
Figure 3A:
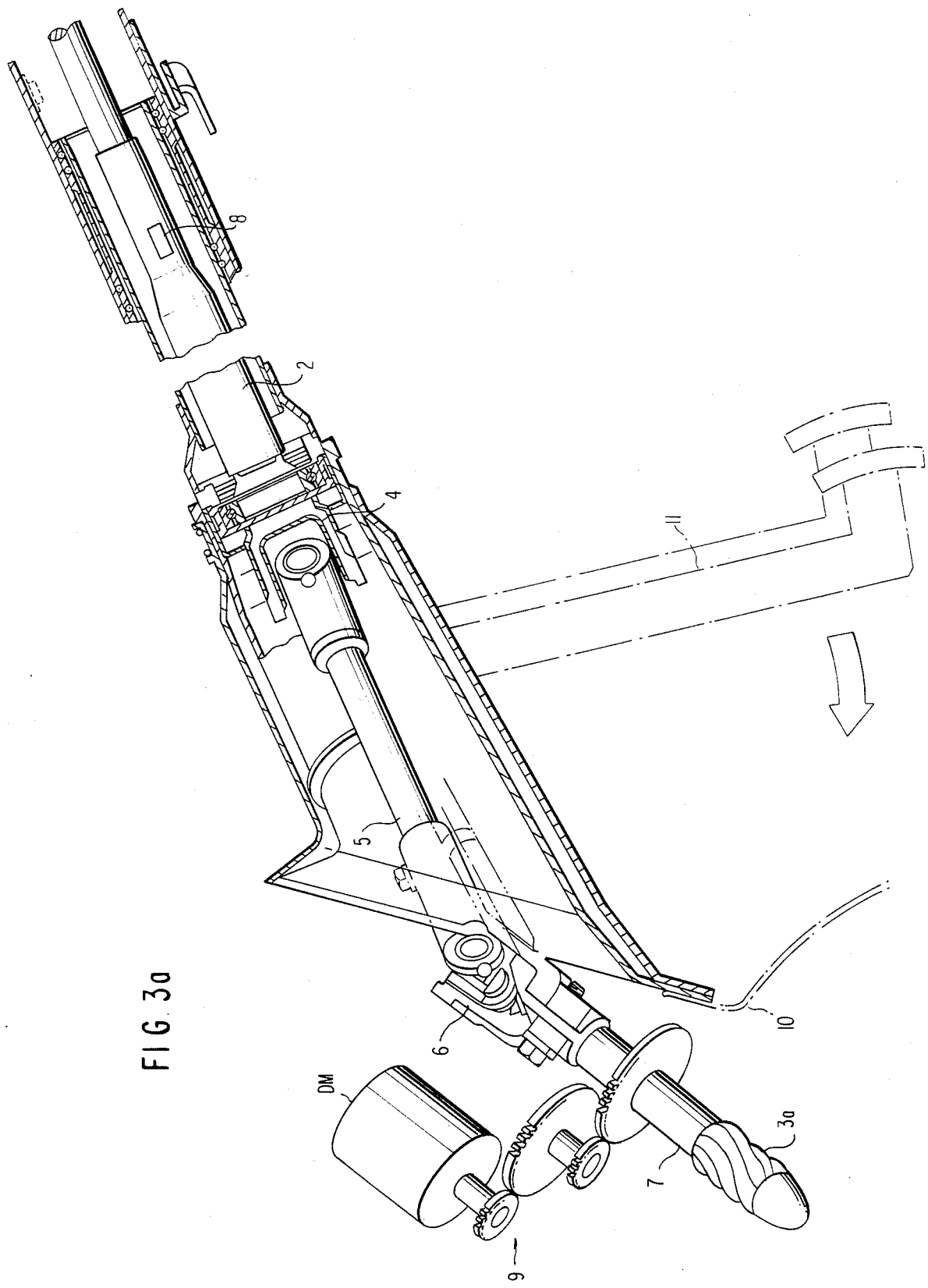
FIG. 3a is a side elevation of the steering mechanism of the automobile shown in FIG. 1.

The details of the mechanism of FIG. 2 are shown in FIGS. 3a and 3b. FIG. 3a shows the portion at the driver's feet in section. In this illustrative example, the reduction gearing 9 consists of a combination of four gears and reduces the velocity of the rotation of the motor DM by a factor of six before transmitting the force to the second shaft 5. In this example, strain gauges are used for the torque sensors 8. Although only one of the sensors 8 is shown, the other torque sensor is firmly secured to the back side of the first shaft 2. That is, in this example, the force necessary to rotate the steering wheel is detected by measuring the torsion of the shaft 2. Each of these torque sensors 8 incorporates two sensors which respond in different directions. In this example, these four sensors are assembled into a bridge circuit to make the system independent of temperature. The steering mechanism shown in FIG. 3a extends through two spaces which are separated by a toe board 10 disposed near the second universal joint 6. The space on the left side of the board 10 as viewed in FIG. 3a is the engine room of the vehicle, while the space on the right side is the passenger's compartment. Indicated by reference numeral 11 is the brake pedal.

Referring next to FIG. 3b, the revolving shafts of the front tires 12a and 12b of the vehicle are held to upper suspension supports 14a and 14b via shock absorbers 13a and 13b, respectively. A coiled spring 15a is mounted between the absorber 13a and the support 14a. Similarly, another coiled spring 15b is mounted between the absorber 13b and the support 14b. Connected to the bearings of the tires 12a and 12b are steering knuckle arms 16a and 16b, respectively, which are also coupled to the rack 3b through tie rods 17a and 17b, respectively. The aforementioned pinion 3a meshes with the rack 3b. Also shown are lower suspension arms 18a, 18b and a stabilizer 19.

Figure 4:
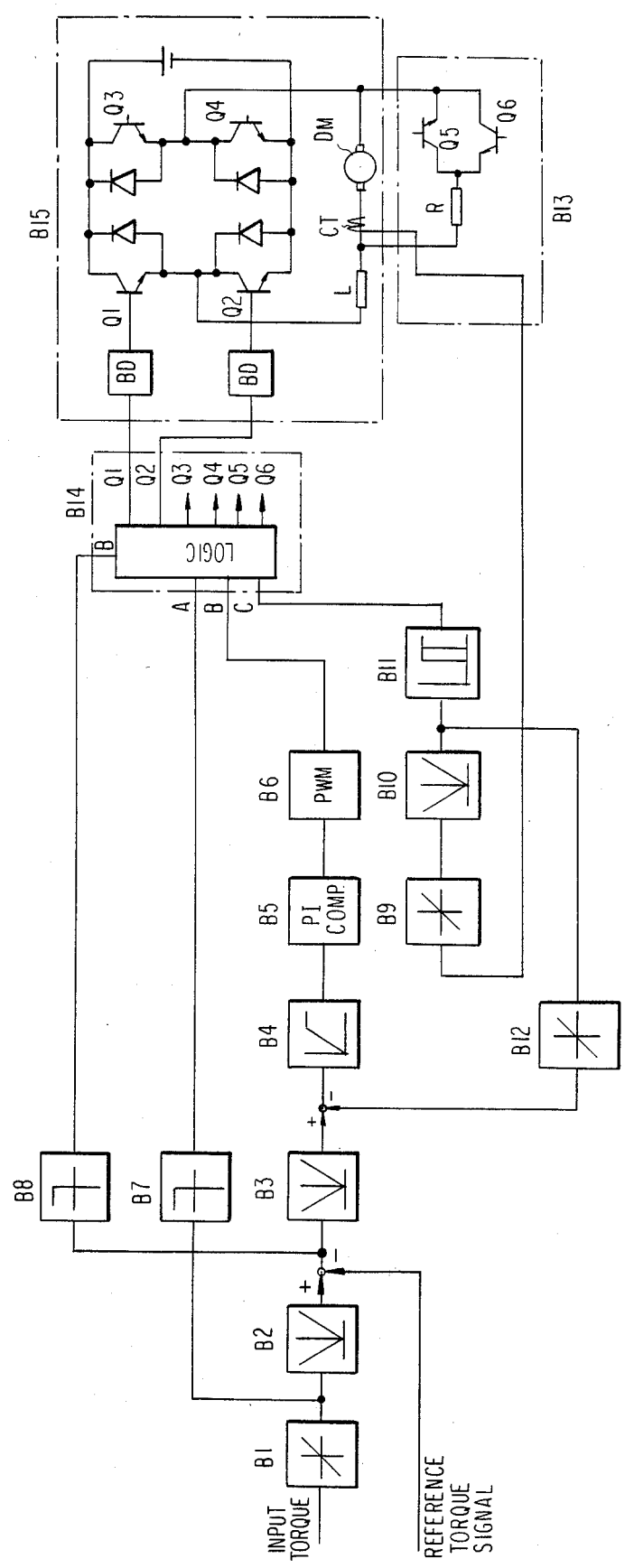
FIG. 4 is a block diagram of the electric circuit of the power steering system shown in FIG. 2.
Figure 5:
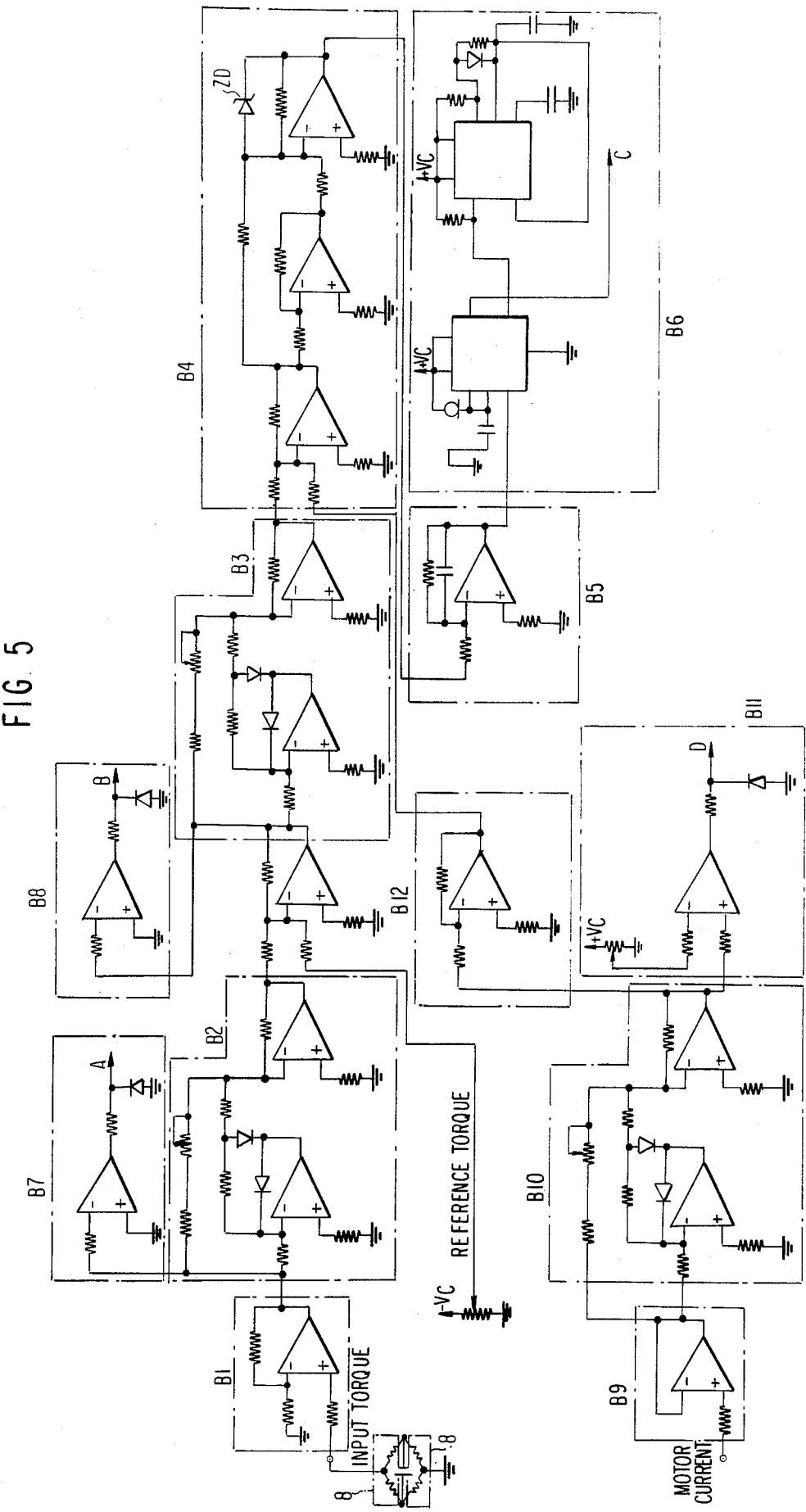
FIG. 5 is a detailed block diagram of a portion of the electric circuit shown in FIG. 4.

FIG. 4 schematically shows the configuration of the electric circuit of the motor-driven power steering system shown in FIG. 2. The graphs in the blocks in FIG. 4 schematically represent the electric characteristics of these blocks. In each graph, the abscissa indicates the input level, while the ordinate indicates the output level. In FIG. 5, each resistor is represented in the form of a small rectangle.

Figure 6:
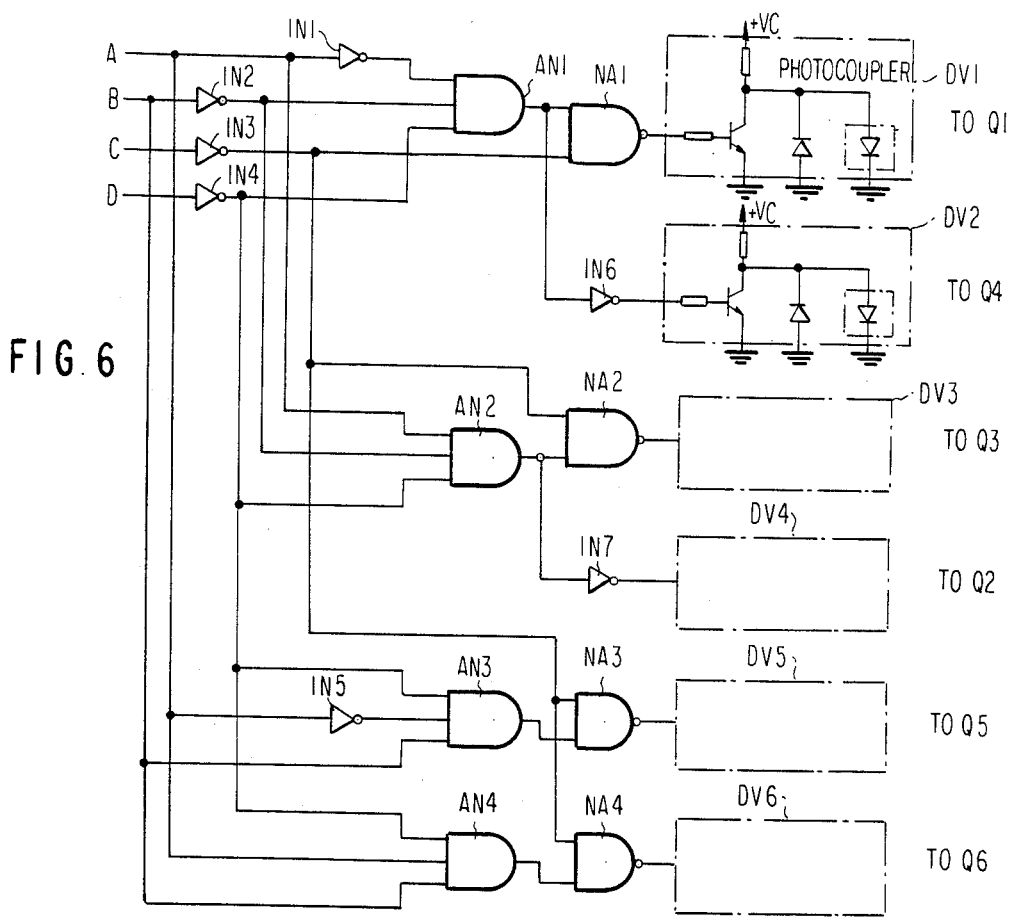
FIG. 6 is a detailed block diagram of another portion of the electric circuit shown in FIG. 4.

Referring next to FIGS. 4-6, the aforementioned two torque sensors 8 constitute a resistance bridge, the output of which is connected to the block B1 that is a linear amplifier. Connected to the output of the block B1 are block B2 and B7. The block B2 is an absolute-value circuit for delivering an an output signal of positive polarity at all times, irrespective of the polarity of its input signal. The block B7 is an analog comparator for sensing the polarity of its input signal and for delivering binary output. Therefore, a signal indicating the direction of the input torque appears at the output of the block B7. This signal is applied to input terminal A of a logic control circuit B14.

In this example, the variable-resistor VR1 is provided to set a reference torque. The level difference between a reference torque signal determined by the resistor VR1 and the output signal from the absolute-value circuit B2 (i.e. the input torque) is applied to the blocks B3 and B8. In actuality, the reference signal and the output signal from the block B2 which are applied to the blocks have opposite polarities, as shown in FIG. 5. The block B3 is an absolute-value circuit. The block B8 is an analog comparator which delivers a binary signal according to the magnitudes of the input torque, or the torque applied by the driver, and of the reference torque. In particular, when the input torque is less than the reference torque, a signal of a high level H is delivered. When the input torque is greater than the reference torque, a signal of a low level L is delivered. This binary signal is applied to input terminal B of the logic circuit B14.

A differential amplifier B4 which is an ordinary linear amplifier is supplied with the output signal from the block B3 and a feedback signal that depends on the current flowing in the motor DM. When the input level of the amplifier B4 exceeds a predetermined value, its output level is clipped to a certain value. The output of the amplifier B4 is connected to a pulse-duration modulation circuit B6 via a PI (proportional plus integral) compensating circuit B5, which acts to eliminate vibration of the control system felt by a person. Specifically, in a system of this kind, the motor is driven in response to the setting of an intended value, and then the mechanical vibration of the motor is detected by the torque sensors. The detected level is controlled so as to coincide with the intended value. When the motor is operated, the detected torque is affected thereby and hence the controlled amount is also varied. Thus, these operations are repeated. Further, since the detected torque signal contains a relatively long time delay of the mechanical system, the signal in the control system produces a self-oscillation of a relatively small amplitude at a frequency of the order of 100 Hz. On the other hand, since the electrical system responds considerably quickly to its input, it causes the motor to follow the oscillation of the signal. As a result, the steering wheel and other parts connected to the motor may vibrate mechanically. Such a frequency of the order of 100 Hz often causes the mechanical system to follow it, resulting in mechanical vibration. This kind of vibration gives a considerable discomfort to the driver. In view of the foregoing, the PI compensating circuit B5 is provided in the electrical control system in this example, to smooth the electrical oscillation for isolating the motor from vibration.

Although the PI compensating circuit is disposed between the pulse-duration modulation circuit B6 and the differential amplifier B4 of the current control system in the embodiment, it may also be placed in a current feedback system described later. Further, it is possible to place it between the blocks B1 and B2 or between B2 and B3 which process the input torque signal. The pulse duration modulation circuit B6 connected to the output of the compensating circuit B5 includes an oscillator which produces a signal of 2 KHz in this example, and the circuit B5 delivers an output of a pulse duration proportional to the input level with a period of 500 μs. This output signal is fed to input terminal D of the control circuit B14.

The current flowing in the motor DM is detected by a current transformer CT, the output signal of which is supplied to a current feedback system consisting of a linear amplifier B9, an absolute-value circuit B10, an analog comparator B11, and a linear amplifier B12. The output signal from the amplifier B12 is fed back to the differential amplifier B4. The comparator B11 serves to prevent overcurrent and delivers an binary signal which depends on whether the current flowing through the motor DM assumes a normal value or an abnormal value. This binary signal is applied to input terminal C of the logic control circuit B14.

A driver B15 for driving the motor and a circuit B13 for braking the motor are connected to their respective output terminals of the logic control circuit B14. Four switching transistors Q1, Q2, Q3, Q4, for energizing the motor, and switching transistors Q5, Q6 are also connected to the output terminals of the control circuit B14 via their respective base drivers BD. The transistors Q1-Q4 are connected in the form of a bridge to permit change in the direction of the current flowing in the coil in the motor DM. In particular, by driving on two of the transistors which are disposed in diametrically opposed relation, the coil is excited in a given direction. The transistors Q5 and Q6 control the connection of a braking resistor R with the coil in the motor DM. More specifically, by driving the transistor Q5 or Q6 on, an electric current flows into the coil of the motor DM through the resistor R, thereby braking the rotation of the motor DM. In the illustrative example, the transistor Q5 or Q6 is driven on, depending the direction of the rotation of the motor DM. A direct-current reactor L functions to prevent occurrence of intermittent electric current due to the pulse-duration control.

Referring next to FIG. 6, the logic control circuit B14 consists of AND gates AN1-AN4, NAND gates NA1-NA4, inverters IN1-IN7, and drivers DV1-DV6. All the drivers DV1-DV6 have the same configuration, and each is provided with a photocoupler including a light-emitting diode. Phototransistors which are to be optically coupled to the respective light-emitting diodes are incorporated in the base drivers BD connected to the bases of the transistors Q1-Q6. Thus, when the light-emitting diodes of the drivers DV1-DV6 light up, the associated transistors Q1-Q6 are driven on.

Figure 7:
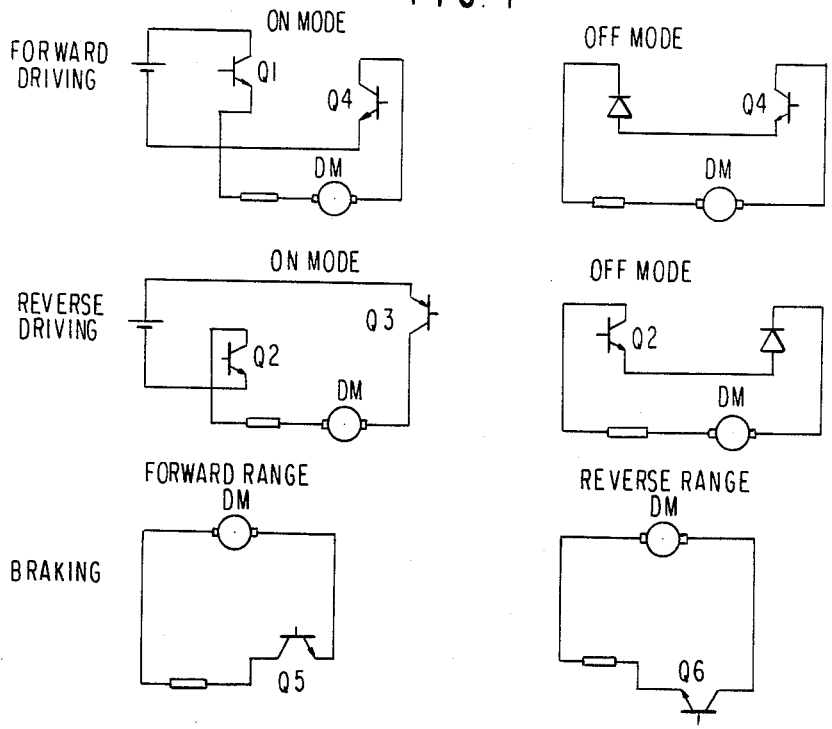
FIG. 7 is a schematic representation showing the manner in which motor DM is electrically connected in various operations modes of the power steering system of FIG. 2.

FIG. 7 shows the manner in which the servomotor DM is connected in various operation modes. The states of the transistors Q1-Q6 in various modes of the system are listed Table 1 below.

TABLE 1

| mode condition | auxiliary torque manual torque > set value | | braking manual torque < set value | |
|---|---|---|---|---|
| direction | forward | reverse | forward | reverse |
| transistor Q1 | ON | OFF | OFF | OFF |
| Q2 | OFF | ON | OFF | OFF |
| Q3 | OFF | ON | OFF | OFF |
| Q4 | ON | OFF | OFF | OFF |
| Q5 | OFF | OFF | ON | OFF |
| Q6 | OFF | OFF | OFF | ON |

A large torque is necessary for the driver to rotate the steering wheel under the condition that the vehicle is at rest, for example. In this case, if the torque applied to the steering shaft exceeds the reference torque set by the variable-resistor VR1, the output from the comparator B8 assumes an auxiliary level L, driving on either the transistors Q1 and Q4 or Q2 and Q3. This drives the motor DM in a given direction, or the same direction as the input torque.

In this way, since the auxiliary torque produced by the motor DM is added to the torque that is applied to the steering shaft by the driver, the driver is able to rotate the steering shaft with a force which is smaller by the auxiliary torque. This auxiliary torque produced by the motor DM increases in proportion to the difference between the input torque and the reference torque, and it acts to make the torque applied by the driver identical in intensity to the reference torque. When the vehicle velocity is high and the torque needed to rotate the steering wheel is smaller than the reference torque, if the power steering system did not operate, the steering operation could be performed with a very small force. However, when the power steering system operates, the output from the comparator B8 assumes a braking level, driving the transistor Q5 or Q6 on. This shortens out the coil in the motor DM via the resistor R. Since the motor DM is always coupled to the steering shaft via the reduction gearing 9, when the driver turns the steering wheel, the motor DM produces an electromotive force. This produces an electric current flowing in the coil through the resistor R. As a result, the motor DM generates a braking torque, whose magnitude is proportional to the difference between the reference torque and the input torque. Hence, the input torque is rendered identical to the reference torque. Although the torque required to rotate the steering wheel varies greatly, the novel power steering system permits the driver to rotate the steering wheel always with the same force as the reference torque without the need to pay attention to the vehicle velocity.

Figure 8:
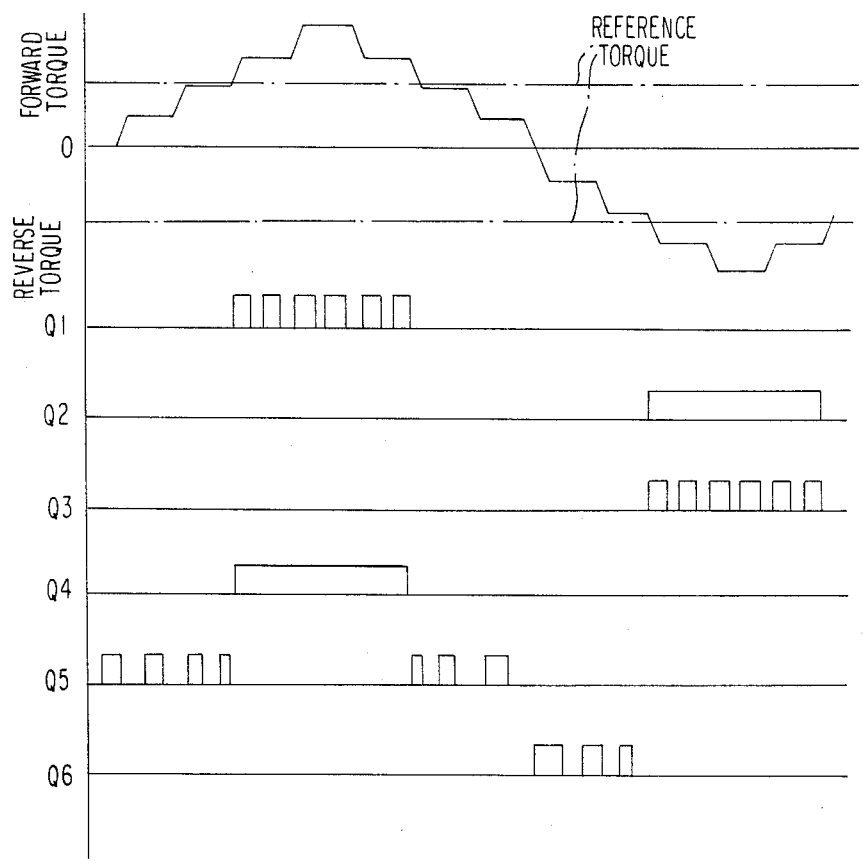
FIG. 8 is a time chart illustrating one operation timing of the motor shown in FIG. 7.

The timings of the operations of the transistors in relation to the input torque are roughly illustrated in FIG. 8. Referring to FIGS. 7 and 8, when the input torque expressed in terms of an absolute value is in the range of 0 to the reference torque, the transistor Q5 or Q6 is repeatedly driven on and off with a certain period, depending on the direction of the input torque, as shown in the diagrams of FIG. 7 written as "forward" and "reverse" braking. As the pulse duration of each period changes according to the difference between the input torque and the reference torque, the braking force produced by the motor DM is equal to the difference between the input torque and the reference torque.

When the input torque exceeds the reference torque, either the transistors Q1 and Q4 or Q2 and Q3 are driven on, as shown in the diagrams of FIG. 7 written as "forward" and "reverse" driving. In this case, the transistors Q1 and Q3 are driven on and off with a given period, thus alternately creating ON mode and OFF mode shown in FIG. 7. The period during which each of the transistors Q1 and Q3 is in ON state, i.e. pulse duration, depends on the difference between the input torque and the reference torque.

Figure 9:
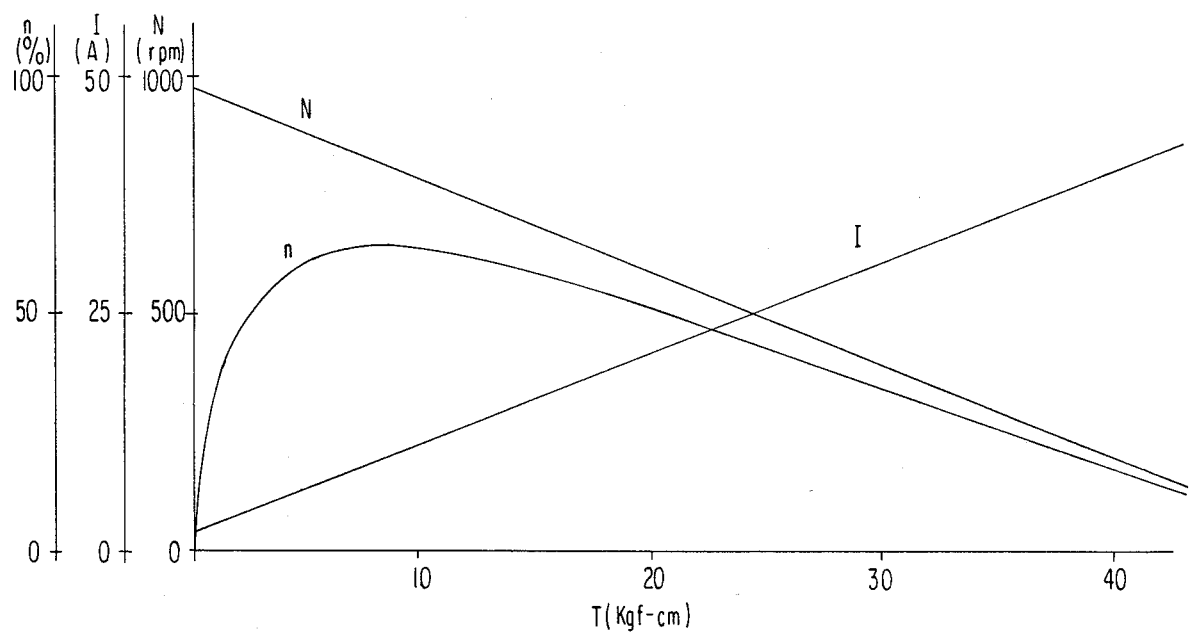
FIG. 9 is a graph showing the characteristics of the motor DM shown in FIG. 7.

FIG. 9 shows the characteristics of the direct-current servomotor DM used in the embodiment described above. It can be seen from this graph that the output torque T is proportional to the current I flowing in the motor. In the graph, N and $\eta$ denotes the rotational frequency and the efficiency, respectively.

Figure 10A:
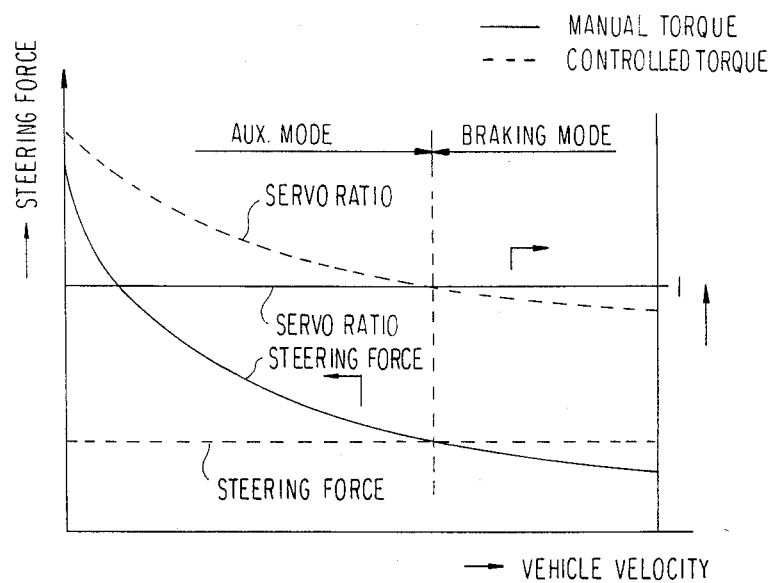
FIG. 10a is a graph showing the relation among the steering torque of the power steering system of FIG. 2, the servo ratio, and the vehicle velocity.
Figure 10B:
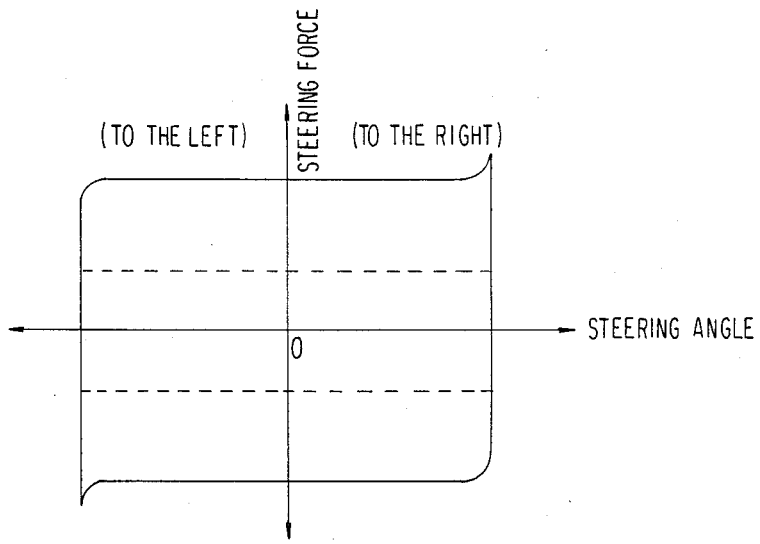
FIG. 10b is a graph showing the relation between the steering force and the steering angle.

FIG. 10a shows the relations among the vehicle velocity, the steering force applied by the driver, and the servo ratio when the power steering system operates and when it does not. FIG. 10b shows the relation between the angle through which the steering wheel is rotated and the torque applied by the driver when the power steering system is operated and the vehicle velocity is nearly zero.

Referring to FIG. 10a, the torque needed to turn the steering wheel changes according to the vehicle velocity (see the characteristic of the manual steering force). When this torque is in excess of the reference torque, the motor DM is driven. On the other hand, when it is less than the reference torque, the motor DM is braked. Since the driving force or braking force generated by the motor DM is equal to the difference between the input torque and the reference torque, the driver should exert a force corresponding to the reference torque to steer the vehicle. Accordingly, the servo ratio which is defined as the ratio of the output torque to the torque applied by the driver becomes smaller as the vehicle velocity increases. When a vehicle velocity is reached at which the output torque equals the reference torque, the system goes from driving mode to braking mode, and the servo ratio becomes less than unity.

Generally, the torque needed to rotate the steering wheel of a vehicle increases as the angle through which the wheel has rotated. However, in the above example, a positive or negative auxiliary torque is produced to make the torque applied by the driver equal to the reference torque. Consequently, as shown in FIG. 10b, the driver is capable of steering the vehicle always with a constant torque, irrespective of the angle through which the steering wheel has rotated.

Although the above embodiment employs the variable-resistor to set the reference torque, it is also possible to use a rotary switch or the like to selectively set the reference torque. Further, a digital circuit including a microcomputer may be used instead. In this case, data concerning the reference torque may be directly entered into the computer using key switches or similar means. A still further arrangement may be used in which a large quantity of data corresponding to the reference torque is previously stored in a memory so that desired data may be retrieved from it under the instructions of key switches or human speech to set a reference torque.

It is also to be noted that although the above embodiment makes use of the resistor to brake the motor, other loads may equally be used with similar utility.

As described hereinbefore, the present invention makes the torque to be applied by a driver constant independently of the vehicle velocity.

What is claimed is:

1. A motor driven power steering system comprising: an electric motor having a coil and armature, means for driving the motor, means for coupling the motor to a steering shaft of a vehicle, detecting means for detecting torque and providing a signal which is indicative of torque applied to the steering shaft by the driver of the vehicle, means for providing a signal indicative of a reference torque, braking means connected to the coil of said motor for braking said motor, an electronic control means operatively connected to said motor and each of said means for energizing said motor driving means according to a difference between an applied torque signal provided by the detecting means and a reference torque signal provided by a setting means when the applied torque is greater than the reference torque and for energizing the braking means according to the difference between the applied torque signal provided by the detecting means and the reference torque signal when the applied torque is less than the reference torque so that the driving torque or braking torque applied by the motor to the steering shaft is always equal to the difference between the applied torque and the reference torque.

2. A motor driven power steering system as set forth in claim 1 wherein said means for providing a signal indicative of the reference torque is a variable voltage setting device.

3. A motor driven power steering system as set forth in claim 1 wherein said braking means is comprised of a resistor and circuit means for selectively connecting said resistor to the coil of said motor.

4. A motor driven power steering system as set forth in claim 1 wherein said electronic control means includes a pulse duration modulation means for controlling the energization of said motor by changing the pulse duration in response to said difference.

* * * * *